United States Patent
Hayashi et al.

(10) Patent No.: US 11,305,944 B2
(45) Date of Patent: Apr. 19, 2022

(54) ARTICLE CONVEYANCE APPARATUS

(71) Applicant: Murata Machinery, Ltd., Kyoto (JP)

(72) Inventors: Masataka Hayashi, Inuyama (JP);
Kenji Kadoguchi, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 17/261,304

(22) PCT Filed: Apr. 15, 2019

(86) PCT No.: PCT/JP2019/016109
§ 371 (c)(1),
(2) Date: Jan. 19, 2021

(87) PCT Pub. No.: WO2020/021792
PCT Pub. Date: Jan. 30, 2020

(65) Prior Publication Data
US 2021/0347577 A1 Nov. 11, 2021

(30) Foreign Application Priority Data
Jul. 23, 2018 (JP) .............................. JP2018-137308

(51) Int. Cl.
*B65G 23/23* (2006.01)
*B65G 47/38* (2006.01)
*B65G 47/46* (2006.01)
*B65G 54/02* (2006.01)

(52) U.S. Cl.
CPC ............. *B65G 23/23* (2013.01); *B65G 47/38* (2013.01); *B65G 47/46* (2013.01); *B65G 54/02* (2013.01)

(58) Field of Classification Search
CPC ........ B65G 23/23; B65G 47/38; B65G 47/46; B65G 54/02
See application file for complete search history.

(56) References Cited

U.S. PATENT DOCUMENTS

| 6,796,417 B2 * | 9/2004 | Soldavini | ............... | B65G 23/00 198/370.06 |
| 2003/0226740 A1 * | 12/2003 | Soldavini | ............... | B61D 43/00 198/618 |

FOREIGN PATENT DOCUMENTS

| EP | 1352855 A2 * | 10/2003 | ............. B61D 43/00 |
| JP | 63-176213 | 7/1988 | |
| JP | 1989-078620 | 5/1989 | |
| JP | 2-295818 | 12/1990 | |

(Continued)

*Primary Examiner* — Gene O Crawford
*Assistant Examiner* — Lester Rushin, III
(74) *Attorney, Agent, or Firm* — DLA Piper LLP (US)

(57) ABSTRACT

An article conveyance apparatus includes a carriage which travels along a predetermined travel path, and a on-ground facility including a pair of traveling rails which define the travel path. The carriage includes a first slider which operates according to magnetic action to drive a transfer mechanism, and a drive transmission mechanism which supports the first slider and transmits a driving force from the first slider to the transfer mechanism. The on-ground facility includes a first stator which applies magnetic action to the first slider in the carriage to operate the first slider. The first stator includes an opening through which the drive transmission mechanism of the carriage passes. The opening is disposed in a position such that the inside of the first stator is not seen from the opening in top view of the first stator.

5 Claims, 7 Drawing Sheets

(56) References Cited

FOREIGN PATENT DOCUMENTS

| | | |
|---|---|---|
| JP | 3-218249 | 9/1991 |
| JP | 6-54403 | 2/1994 |
| JP | H07-021452 | 5/1995 |
| JP | 07-090911 | 10/1995 |
| JP | 9-252504 | 9/1997 |
| JP | 2001-225943 | 8/2001 |

* cited by examiner

ARTICLE CONVEYANCE APPARATUS

TECHNICAL FIELD

This disclosure relates to an article conveyance apparatus that conveys articles using a primary-side on-ground linear motor.

BACKGROUND

An article conveyance apparatus including a conveyance carriage that is provided with a transfer conveyor and travels on a travel path according to a thrust generated by a linear motor is known in the related art (for example, see Japanese Examined Utility Model (Registration) Application Publication No. H07-21452). The conveyance carriage includes a slider the transfer conveyor, and a stator disposed in a predetermined position on the travel path to apply magnetic action to the slider of the conveyance carriage. In other words, when the conveyance carriage stops in the predetermined position on the travel path or approaches the predetermined position while decelerating, a motor is constituted by the slider in the conveyance carriage and the stator in the travel path to drive the transfer conveyor according to magnetic action from the motor.

When foreign substances invade between the stator and the slider of the motor, the travel of the conveyance carriage may be obstructed by the foreign substances.

Thus, it could be helpful to provide an article conveyance apparatus that can prevent invasion of foreign substances into a motor.

SUMMARY

Our article conveyance apparatus includes a carriage configured to travel along a predetermined travel path; and an on-ground facility including a pair of traveling rails that define the travel path. The carriage includes a transfer mechanism configured to transfer an article in a transfer space disposed in a predetermined position on the travel path; a first slider that is a rod-shaped member extending under the transfer mechanism in a traveling direction, and configured to operate according to magnetic action to drive the transfer mechanism; and a drive transmission mechanism configured to support the first slider and transmit a driving force from the first slider to the transfer mechanism, the drive transmission mechanism going through a space between the pair of traveling rails. The on-ground facility includes a first stator disposed in a position corresponding to the transfer space to apply magnetic action to the first slider in the carriage located in the transfer space to operate the first slider. The first stator includes an opening through which the drive transmission mechanism of the carriage located in the transfer space passes, and enables placement of the first slider inside the first stator, and the opening is disposed in a position such that an inside of the first stator is not seen from the opening in top view of the first stator.

Such a configuration can block invasion of foreign substances into the opening of the first stator from above because the opening of the first stator is disposed in a position such that the inside of the first stator is not seen from the opening in top view of the first stator. In other words, even when the carriage is not present above the first stator and the first stator is exposed, the first stator by itself can block invasion of foreign substances thereinto from above. Accordingly, the invasion of foreign substances into the motor configured by the first stator and the first slider can be prevented.

Moreover, the first stator includes a plurality of first stators separately arranged along the travel path.

In such a configuration, the opening of each of the plurality of first stators is disposed in the position described above even when the first stators are separately arranged along the travel path. In short, each of the first stators by itself can prevent invasion of foreign substances thereinto from above. Accordingly, invasion of foreign substances into the motors configured by the first stators and the first sliders, respectively, can be prevented.

Moreover, the carriage includes a plurality of carriages, and the plurality of carriages travels freely and independently of each other.

Such a configuration, where the carriages travel on the travel path freely and independently of each other, can reduce occurrence of empty carriages compared to when the travel path is entirely covered with a plurality of connected carriages.

Moreover, because the carriages travel on the travel path freely and independently of each other, intervals before and/or after the carriages are generated at any time. Thus, this often causes the state where the carriage is not present above the first stator. However, the first stators by themselves block invasion of foreign substances thereinto from above as described above, preventing invasion of foreign substances into the motors configured by the first stators and first sliders, respectively, even in this instance.

Moreover, the on-ground facility includes second stators disposed along the travel path, and the carriage includes a second slider configured to operate according to magnetic action from the second stator to cause the carriage to travel along the travel path.

Such a configuration can also prevent invasion of foreign substances into the motor configured by the first stator and the first slider even in the article conveyance apparatus including the second stator disposed along the travel path and the second slider which operates according to magnetic action from the second stator to cause the carriage to travel along the travel path.

Moreover, the on-ground facility includes a shielding plate configured to cover a region not including at least the first stator in a moving path on which the first slider moves when the carriage travels on the travel path.

In such a configuration, at least the region not including the first stator in the moving path on which the first slider moves is covered with the shielding plate. For this reason, the first slider which is moving in the region is covered with the shielding plate. In short, approaching of foreign substances to the moving first slider is prevented by the shielding plate. Thereby, invasion of foreign substances into the motor configured by the first stator and the first slider can be more surely prevented.

The article conveyance apparatus can prevent invasion of foreign substances into the motor.

DETAILED DESCRIPTION

Example

An article conveyance apparatus according to an example will now be described with reference to the drawings. The drawings are schematic views, and are not always strictly drawn.

Moreover, the example described below illustrates one specific configuration of our apparatus. Numeric values, shapes, materials, components, arrangements, positions, and connection forms of the components and the like shown in the example below are only representative examples, and will not be construed as limitations to this disclosure. Moreover, among the components of the example below, the components not described in an independent claim representing the most superordinate concept are described as arbitrary components.

Configuration

Figure 1:
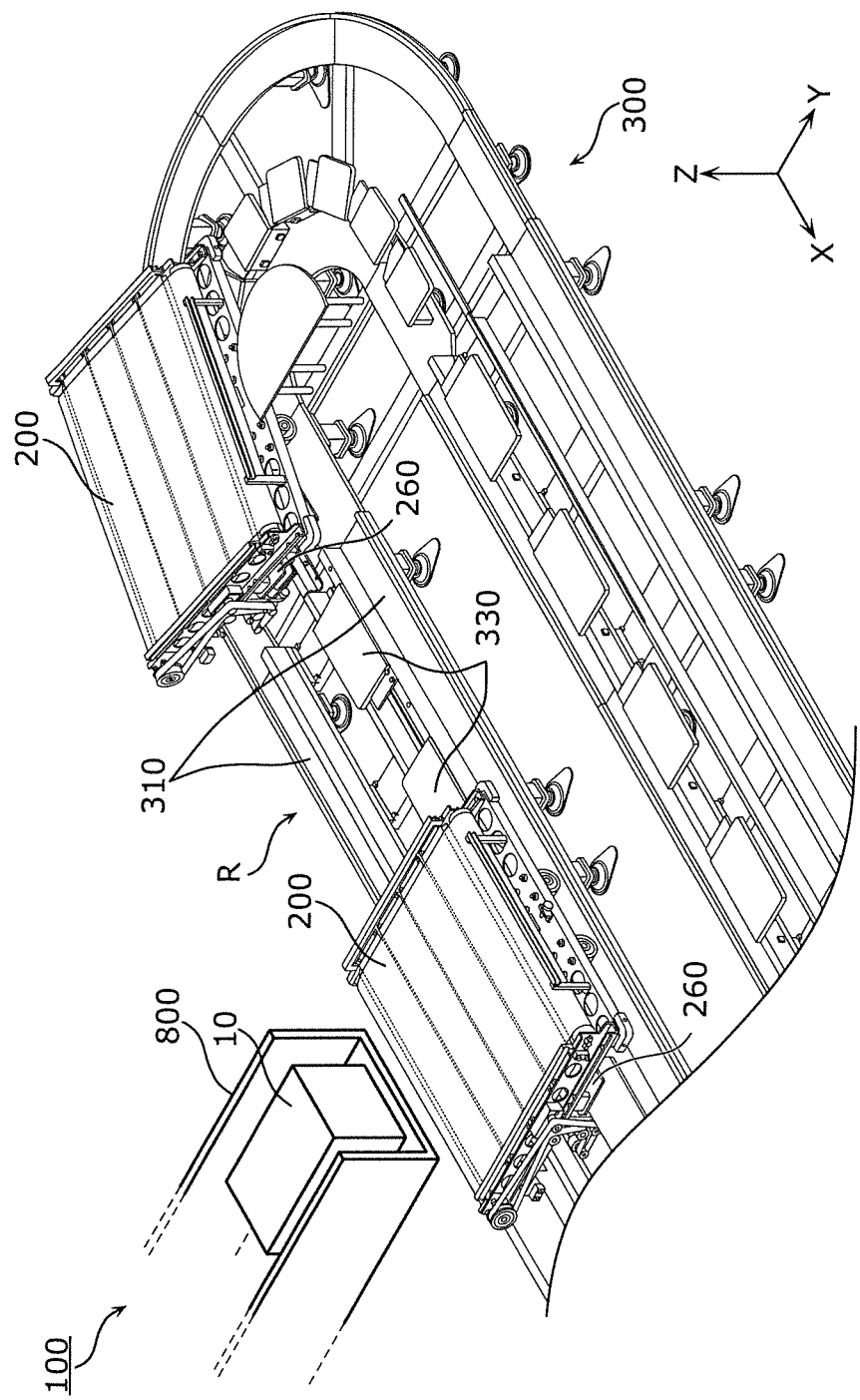
FIG. 1 is a perspective view illustrating a configuration of the article conveyance apparatus according to an example.
Figure 2:
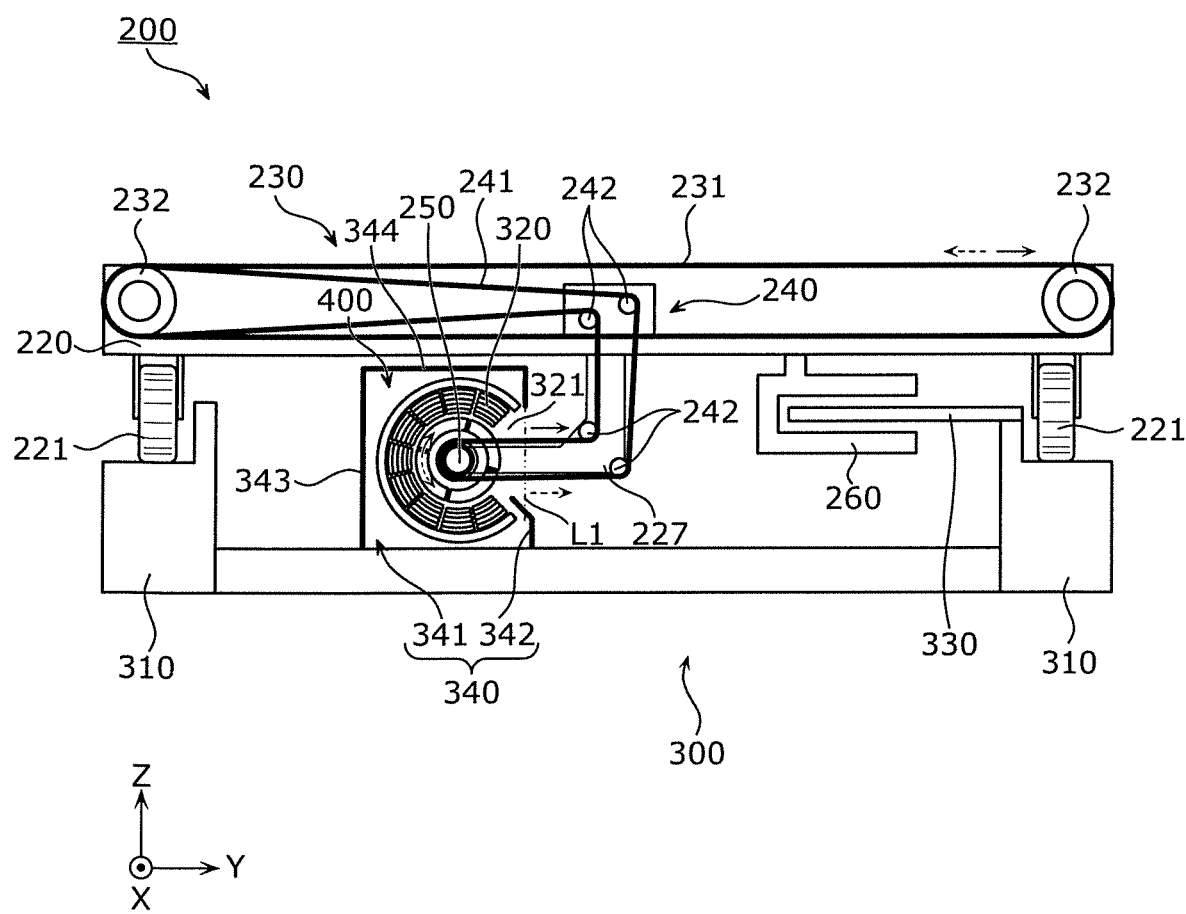
FIG. 2 is a cross-sectional view of the article conveyance apparatus according to the example, which is taken along the transverse direction of the conveyance carriage.

First, an outline of article conveyance apparatus 100 according to an example will be described. FIG. 1 is a perspective view illustrating a configuration of the article conveyance apparatus according to the example. FIG. 2 is a cross-sectional view of the article conveyance apparatus according to the example, which is taken along the transverse direction of a conveyance carriage.

As illustrated in FIGS. 1 and 2, article conveyance apparatus 100 includes a plurality of carriages 200 traveling along predetermined travel path R and on-ground facility 300 including a pair of traveling rails 310 which define travel path R.

Carriages 200 can each independently stop or accelerate/decelerate while traveling by a primary-side on-ground linear motor system including second stators 330 disposed on predetermined travel path R and second slider 260 included in carriage 200.

Carriage 200 is a conveyance carriage that travels along travel path R by traveling on the pair of traveling rails 310. Carriage 200 includes carriage body 220, transfer mechanism 230, drive transmission mechanism 240, first slider 250, second slider 260, and detection target 270 (see FIG. 4).

Carriage body 220 includes a plurality of wheels 221 that travel on the pair of traveling rails 310. Carriage body 220 includes transfer mechanism 230, drive transmission mechanism 240, first slider 250, second slider 260, and detection target 270.

Under application of a driving force from motor 400 described later, transfer mechanism 230 transfers an article in a direction intersecting travel path R (in the Y-axis direction). Although transfer mechanism 230 transfers the article in the Y-axis direction in this example, the transfer direction may be any other direction than the Y-axis direction, and may be not strictly orthogonal to travel path R as long as it intersects travel path R. For example, the transfer direction of transfer mechanism 230 may intersect travel path R at an angle of 45 degrees.

Transfer mechanism 230 is a belt conveyor for transfer, for example, and is disposed in an upper portion of carriage body 220. Transfer mechanism 230 includes endless belt 231 and a pair of pulleys 232 around which endless belt 231 is wound. Endless belt 231 rotates following rotation of one pulley 232 in the pair of pulleys 232. Thereby, the article on endless belt 231 travels in the transfer direction (Y-axis direction). In other words, in response to drive of endless belt 231 in the Y-axis direction, transfer mechanism 230 transfers article 10 from the outside in the Y-axis direction onto the top surface of carriage 200 (i.e., top surface of endless belt 231), or transfers article 10, which is placed on the top surface of carriage 200, from the top surface to the outside in the Y-axis direction. Transfer mechanism 230 is not limited to a belt conveyor, and may be a roller conveyor.

Drive transmission mechanism 240 transmits the driving force from motor 400 described later to transfer mechanism 230. Specifically, drive transmission mechanism 240 includes endless belt 241, and a plurality of rollers 242 that rotatably supports endless belt 241. The plurality of rollers 242 is attached to support member 227 disposed in carriage body 220. Part of support member 227 projects downwardly from carriage body 220. This part of support member 227 is shaped to come into first stator 320 of on-ground facility 300 in the X-axis direction while carriage 200 is traveling on travel path R. This part of support member 227 is shaped not to interfere with first stator 320.

Endless belt 241 is wound around one pulley 232 in transfer mechanism 230. Endless belt 241 rotates under application of a driving force from motor 400 described later, and then one pulley 232 also rotates, resulting in rotation of endless belt 231 in transfer mechanism 230. Endless belt 241 is a rubber belt, for example. Endless belt 241 is not limited to a rubber belt, and may be a chain.

Motor 400 is configured by first slider 250 together with first stator 320 included in on-ground facility 300. First slider 250 operates according to magnetic action given from first stator 320 to drive transfer mechanism 230. Specifically, first slider 250 is a rod-shaped member extending under transfer mechanism 230 in the traveling direction, and is rotatably held at a distal end of support member 227. First slider 250 has a cylindrical shape whose axis matches the rotational axis of first slider 250, and is made from a plurality of permanent magnets directed to radially generate the magnetic field about the rotational axis viewed from the rotational axis direction such that the S poles and the N poles are alternately disposed in the circumferential direction of the cylindrical shape. Endless belt 241 in drive transmission mechanism 240 is wound around first slider 250. In other words, first slider 250 rotates according to the magnetic action given from first stator 320, and then endless belt 231 in transfer mechanism 230 also rotates through endless belt 241 and one pulley 232.

Second slider 260 is made from a plurality of permanent magnets, for example. These permanent magnets constituting second slider 260 are aligned and disposed in the traveling direction of carriage 200. Second slider 260 is disposed on the bottom surface of carriage body 220, and includes one open end in the Y-axis direction. Second slider 260 has a configuration in which the permanent magnets are aligned in two rows in the Z-axis direction with the opening interposed therebetween. Second stator 330 included in on-ground facility 300 is disposed inside the opening of second slider 260. The permanent magnets in each row are arranged such that the N poles and the S poles alternately face second stator 330. Second slider 260 may be configured with one row of permanent magnets, other than two rows of permanent magnets. Second slider 260 may also be configured with permanent magnets in a plurality of rows aligned in the traveling direction.

Detection target 270 is a permanent magnet, for example, and a member to be detected by position sensor 350. Detection target 270 may not be a permanent magnet, and may be carriage 200 itself when position sensor 350 is a sensor using laser light, ultrasonic waves, or an image captured with a camera.

Figure 3:
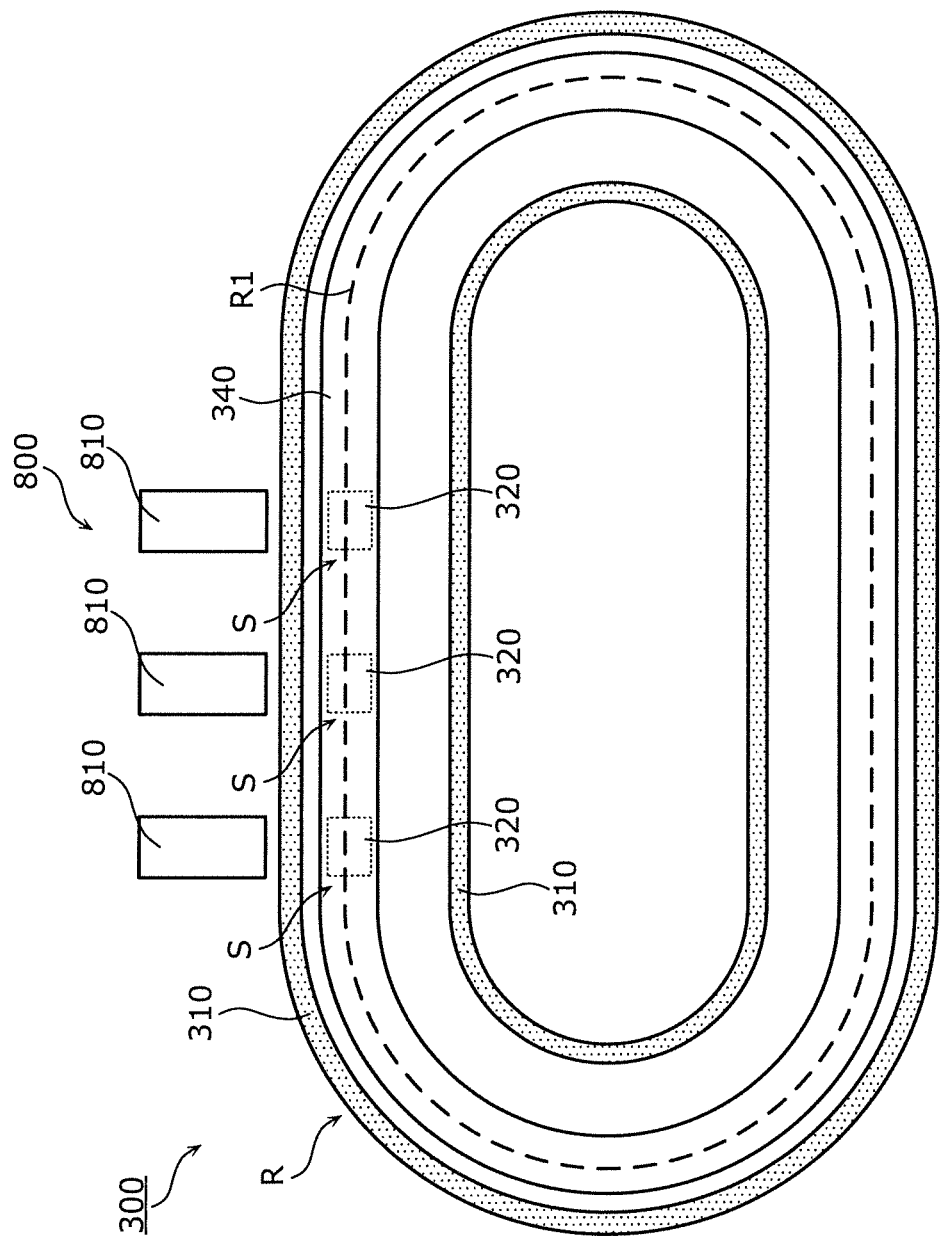
FIG. 3 is a plan view schematically illustrating an outline of the configuration of the on-ground facility according to the example.

Next, on-ground facility 300 will be described. FIG. 3 is a plan view schematically illustrating an outline of the configuration of on-ground facility 300 according to the example. In the illustration in FIG. 3, the pair of traveling rails 310 are dot hatched.

Figure 4:
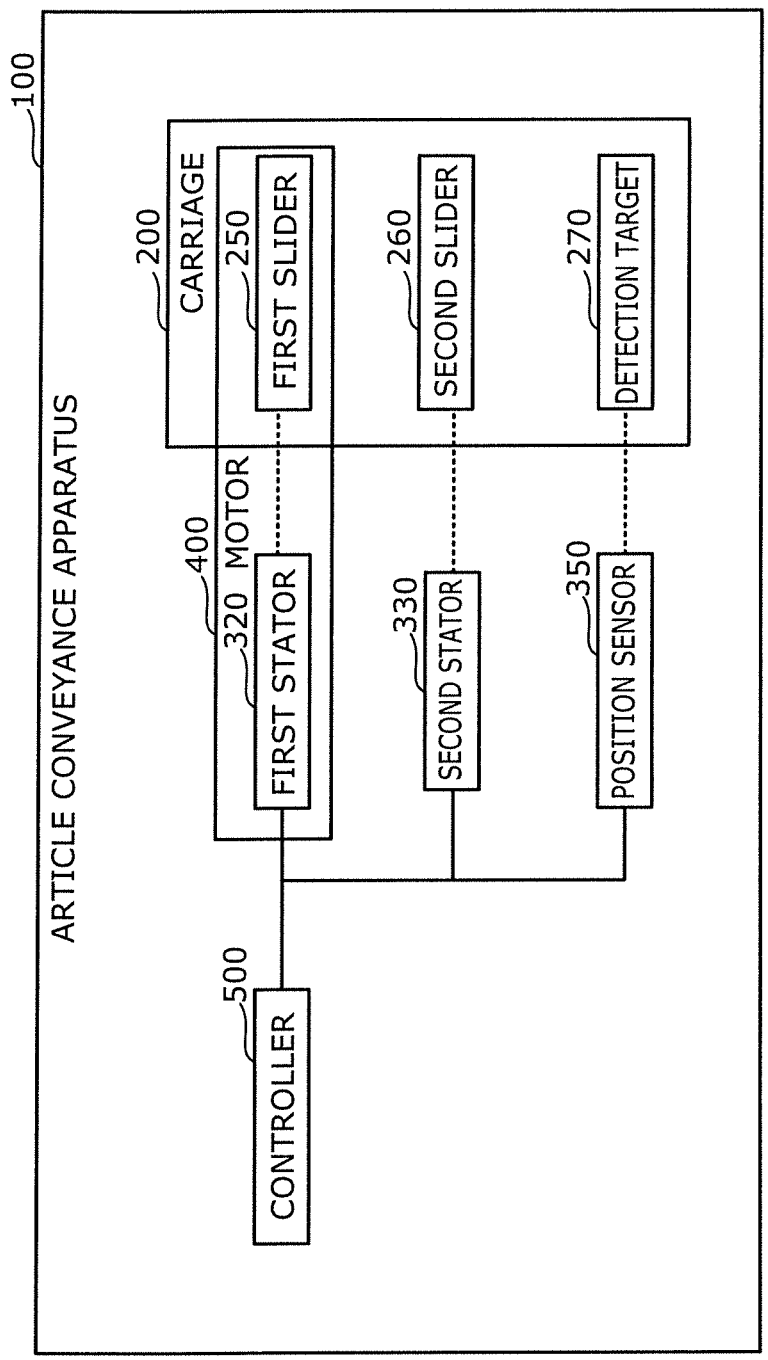
FIG. 4 is a block diagram illustrating a functional configuration of the article conveyance apparatus according to the example.

As illustrated in FIGS. 1 to 3, on-ground facility 300 includes a pair of traveling rails 310, first stator 320, second stators 330, shielding plate 340, and position sensor 350 (see FIG. 4). In FIG. 1, shielding plate 340 is not illustrated.

Traveling rail 310 is a member disposed along predetermined travel path R. Specifically, as illustrated in FIG. 3, travel path R is disposed in an oval shape. Traveling rails 310 are two members disposed along travel path R and aligned in a direction intersecting perpendicular to travel path R. Traveling rails 310 are made of a metal such as aluminum or an aluminum alloy. Alternatively, traveling rails 310 may be made of a resin. In this example, as illustrated in FIGS. 1 and 3, traveling rails 310 cross conveyance path 810 of conveyance apparatus 800 that conveys article 10, and include transfer space S where article 10 is transferred to/from conveyance apparatus 800. In this example, three conveyance paths 810 are disposed for one travel path R. For this reason, three transfer spaces S are disposed for one travel path R, and are separately arranged along travel path R. Any number of conveyance paths 810 other than three may be disposed, and thus the corresponding number of transfer spaces S are disposed in conveyance path 810. In other words, it is sufficient that at least one transfer space S is disposed for one travel path R.

First stator 320 is a stator that applies magnetic action to first slider 250 of carriage 200, which stops at transfer space S or enters transfer space S while decelerating, to operate first slider 250. Several first stators 320 are separately arranged along travel path R. Specifically, first stators 320 are disposed in positions corresponding to transfer spaces S.

First stator 320 is disposed in a position allowing it to surround an approximately cylindrical region through which first slider 250 included in carriage 200 passes during traveling of carriage 200. Specifically, first stator 320 has an approximately cylindrical shape having a hollow penetrating through the X-axis direction, and part of the circumferential wall is opened to define opening 321. Opening 321 is continuously disposed across first stator 320 in the X-axis direction. Thus, first stator 320 has an approximately C-shape viewed from the X-axis direction. First stator 320 is made from a plurality of coils aligned in the circumferential direction of the approximately cylindrical region.

First stator 320 has a shape allowing it to surround a region corresponding to about 270 degrees of a circumference in the traveling direction (X-axis direction) of carriage 200. In other words, first stator 320 is shaped to have a cylindrical lateral surface with a missing part corresponding to a region of about 90 degrees thereof. First stator 320 is disposed such that the missing part of the cylindrical shape faces the plus side of the Y-axis direction. As described above, opening 321 is disposed in a position such that the inside of first stator 320 is not seen from opening 321 in top view of first stator 320. The top view indicates that first stator 320 is viewed from the plus side of the Z-axis direction.

Drive transmission mechanism 240 and support member 227 of carriage 200, which stops at transfer space S or enters transfer space S while decelerating, pass through opening 321. In this state, first slider 250 supported by support member 227 is placed inside first stator 320.

Second stator 330 is disposed along travel path R inside the opening of second slider 260. Specifically, second stator 330 includes a base extending along travel path R in the horizontal direction, and a plurality of coils disposed along the extending direction of the base. In other words, substantially, the plurality of coils functions as second stator 330. The coils constituting second stator 330 are individually controlled by controller 500 (see FIG. 4) to each independently generate a magnetic field. Thus, by individually controlling the coils constituting second stator 330 by controller 500, magnetic action is given to second slider 260 of carriage 200 to apply a force in the X-axis direction. Thus, carriage 200 travels on traveling rail 310.

Moving path R1 is covered with shielding plate 340, first slider 250 moving on moving path R1 during traveling of carriage 200 on travel path R. In FIG. 3, moving path R1 of first slider 250 is represented by the dashed line. As illustrated in FIG. 3, shielding plate 340 is continuously disposed across moving path R1. If foreign substances fall onto moving path R1, shielding plate 340 prevents interference with first slider 250 from the foreign substances by blocking further fall thereof.

Specifically, as illustrated in FIG. 2, shielding plate 340 includes first portion 341 and second portion 342. First portion 341 and second portion 342 are made of a metal such as iron.

First portion 341 covers an upper portion of moving path R1. First portion 341 covers an upper portion of first stator 320 located in a place corresponding to transfer space S. First portion 341 includes wall portion 343 and ceiling portion 344. Wall portion 343 is disposed opposite to opening 321 of first stator 320 to cover the lateral portions of moving path R1 and first stator 320. Ceiling portion 344 extends in the horizontal direction from the upper portion of wall portion 343 to cover the upper portions of moving path R1 and first stator 320. The distal end of ceiling portion 344 is downwardly suspended to not interfere with drive transmission mechanism 240 and support member 227 of carriage 200. Thus, at least part of opening 321 of first stator 320 is exposed from the distal end of ceiling portion 344.

Second portion 342 is disposed close to opening 321 of first stator 320. Second portion 342 is upwardly elected to not interfere with drive transmission mechanism 240 and support member 227 of carriage 200. Thus, at least part of opening 321 of first stator 320 is exposed from second portion 342.

The proximal end of second portion 342 is disposed in a position remoter from first stator 320 than the distal end of ceiling portion 344 in the Y-axis direction. The upper end of second portion 342 is bent toward first stator 320. Specifically, the upper end of second portion 342 is inclined to the proximal end of second portion 342 at an angle of 90 degrees or more and less than 180 degrees. The upper end of second portion 342 overlaps extended line L1 of the distal end of ceiling portion 344. In second portion 342 having such a configuration, even when foreign substances fall and pass near ceiling portion 344, the foreign substances are repelled to the outside of shielding plate 340 by the upper end of second portion 342. In other words, invasion of the foreign substances into shielding plate 340 is reduced in this configuration, and interference with first stator 320 and first slider 250 from foreign substances is more significantly reduced.

Position sensor 350 is a sensor that detects the position of each carriage 200. Position sensor 350 is a magnetic sensor, for example, and detects the position of the permanent magnet as detection target 270 disposed in each carriage 200. Position sensor 350 may not be a magnetic sensor, and may be a sensor using laser light, ultrasonic waves, or an image captured with a camera.

Position sensor 350 is disposed along travel path R. Specifically, position sensor 350 is disposed across the zone where second stator 330 is disposed. Thus, article conveyance apparatus 100 can control the traveling operation of each carriage 200 by controlling second stator 330 corresponding to the position of carriage 200 detected by position sensor 350.

FIG. 4 is a block diagram illustrating a functional configuration of the article conveyance apparatus according to the example.

Article conveyance apparatus 100 includes controller 500, first stator 320, second stators 330, position sensor 350, and a plurality of carriages 200.

First stator 320, second stator 330, position sensor 350, and the plurality of carriages 200 have been described above, and their descriptions will be omitted. In short, only controller 500 will be described here. Although only one carriage 200 is illustrated in FIG. 4, other carriages 200 also function similarly.

Controller 500 controls the operation of a primary-side on-ground linear motor system configured by second stator 330 and second slider 260 of carriage 200. For example, by controlling second stator 330, controller 500 causes each of carriages 200 to stop at transfer space S or enter transfer space S while decelerating. In this state, by controlling first stator 320, controller 500 causes an article to be transferred between carriage 200 and conveyance apparatus 800 through transfer mechanism 230.

By controlling second stator 330, controller 500 may cause the plurality of carriages 200 to travel synchronously.

Controller 500 is configured with a processor that executes a predetermined program and a memory which stores the predetermined program, for example. Alternatively, controller 500 may be configured with a dedicated circuit.

As described above, article conveyance apparatus 100 according to this example includes carriage 200 traveling along predetermined travel path R, and on-ground facility 300 including a pair of traveling rails 310 that define travel path R. Carriage 200 includes transfer mechanism 230 that transfers an article in transfer space S disposed in a predetermined position in travel path R, first slider 250 that is a rod-shaped member extending under transfer mechanism 230 in the traveling direction, and operates according to magnetic action to drive transfer mechanism 230, and drive transmission mechanism 240 that supports first slider 250 and transmits the driving force from first slider 250 to transfer mechanism 230, and goes through the space between the pair of traveling rails 310. On-ground facility 300 includes first stator 320 disposed in a position corresponding to transfer space S to apply magnetic action to first slider 250 in carriage 200 located in transfer space S to operate first slider 250. First stator 320 includes opening 321 through which drive transmission mechanism 240 of carriage 200 located in transfer space S passes and enables placement of first slider 250 inside first stator 320. Opening 321 is disposed in a position such that the inside of first stator 320 is not seen from opening 321 in top view of first stator 320.

Such a configuration can block invasion of foreign substances into opening 321 of first stator 320 from above because opening 321 of first stator 320 is disposed in a position such that the inside of first stator 320 is not seen from opening 321 in top view of first stator 320. In other words, even when carriage 200 is not present above first stator 320 and first stator 320 is exposed, first stator 320 by itself can block invasion of foreign substances thereinto from above. Accordingly, the invasion of foreign substances into motor 400 configured by first stator 320 and first slider 250 can be prevented.

Two or more first stators 320 are separately arranged along travel path R.

In such a configuration, opening 321 of each of first stators 320 is disposed in the position described above even when first stators 320 are separately arranged along travel path R. In short, each first stator 320 by itself can block invasion of foreign substances thereinto from above. Accordingly, invasion of foreign substances into motors 400 configured by first stators 320 and first sliders 250, respectively, can be prevented.

Moreover, a plurality of carriages 200 is disposed, and carriages 200 travel freely and independently of each other.

Such a configuration, where carriages 200 travel on travel path R freely and independently of each other, can reduce occurrence of empty carriage 200 compared to when travel path R is entirely covered with a plurality of connected carriages 200.

Because carriages 200 travel on travel path R freely and independently of each other, intervals before and/or after carriages 200 are generated at any time. Thus, this often causes the state where carriage 200 is not present above first stator 320. However, first stator 320 by itself blocks invasion of foreign substances thereinto from above as described above, also preventing invasion of the foreign substances into motors 400 configured by first stators 320 and first sliders 250, respectively, even in this instance.

Moreover, on-ground facility 300 includes second stators 330 disposed along travel path R, and carriage 200 includes second slider 260 operated according to magnetic action from second stator 330 to cause carriage 200 to travel along travel path R.

Such a configuration can also prevent invasion of foreign substances into motor 400 configured by first stator 320 and first slider 250 even in article conveyance apparatus 100 including second stators 330 disposed along travel path R and second slider 260 that operates according to magnetic action from second stator 330 to cause carriage 200 to travel along travel path R.

Moreover, on-ground facility 300 includes shielding plate 340 that covers the entire moving path R1 on which first slider 250 moves when carriage 200 travels on travel path R.

In such a configuration, upper and lateral sides of the entire moving path R1 on which first slider 250 moves are covered with shielding plate 340 and, therefore, first slider 250 that moves on moving path R1 is covered with shielding plate 340. In short, invasion of foreign substances into first slider 250 when moving is blocked by shielding plate 340.

Thereby, invasion of foreign substances into motor 400 configured by first stator 320 and first slider 250 can be more surely prevented.

Modification 1

In the example above, an instance where the entire moving path of first slider 250 is covered with shielding plate 340 from above has been illustrated. However, it is sufficient that from above, shielding plate 340A covers the region not including at least first stator 320 in the moving path of first slider 250.

Modification 1 will now be described in detail. Identical referential numerals will be given to components identical to those in the example above, and the descriptions thereof will be omitted in some instances.

Figure 5:
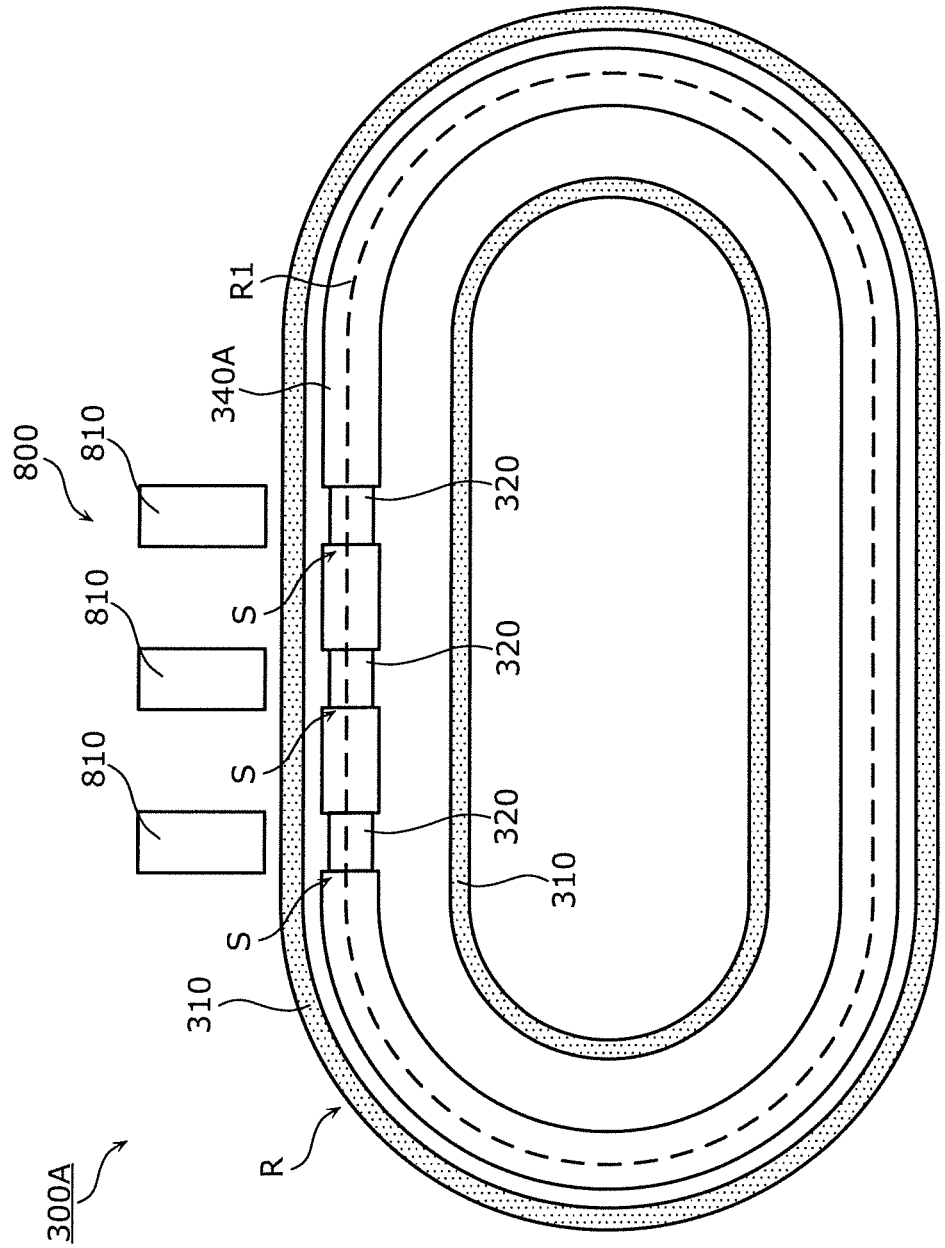
FIG. 5 is a plan view schematically illustrating an outline of the configuration of the on-ground facility according to Modification 1.

FIG. 5 is a plan view schematically illustrating an outline of the configuration of on-ground facility 300A according to Modification 1. In FIG. 5, a pair of traveling rails 310 are dot hatched.

As illustrated in FIG. 5, on-ground facility 300A according to Modification 1 includes shielding plate 340A. Shielding plate 340A is divided into several sections along travel path R, and first stators 320 are exposed from the intervals. Thereby, from above, shielding plate 340A covers the entire regions not including first stator 320 in moving path R1 of first slider 250.

Thus, on-ground facility 300 includes shielding plate 340 that covers at least the region not including first stator 320 in moving path R1 on which first slider 250 moves when carriage 200 travels on travel path R.

In such a configuration, at least the region not including first stator 320 in moving path R1 on which first slider 250 moves is covered with shielding plate 340 from upper and lateral sides. As a result, first slider 250 moving in the region is covered with shielding plate 340. In short, approaching of foreign substances to first slider 250 that is moving is prevented by shielding plate 340. Thereby, invasion of foreign substances into motor 400 configured by first stator 320 and first slider 250 can be more surely prevented.

Shielding plate 340 may not cover the immediately above region of moving path R, or may cover a lateral or obliquely upward side of moving path R. Shielding plate 340A may be a dummy first stator without magnetic action.

Modifications 2 and 3

In the example above, an instance where first stator 320 is disposed such that opening 321 is directed to the plus side of the Y-axis direction has been illustrated. However, opening 321 may face any direction as long as the inside of first stator 320 is not seen from opening 321 in top view of first stator 320.

Figure 6:
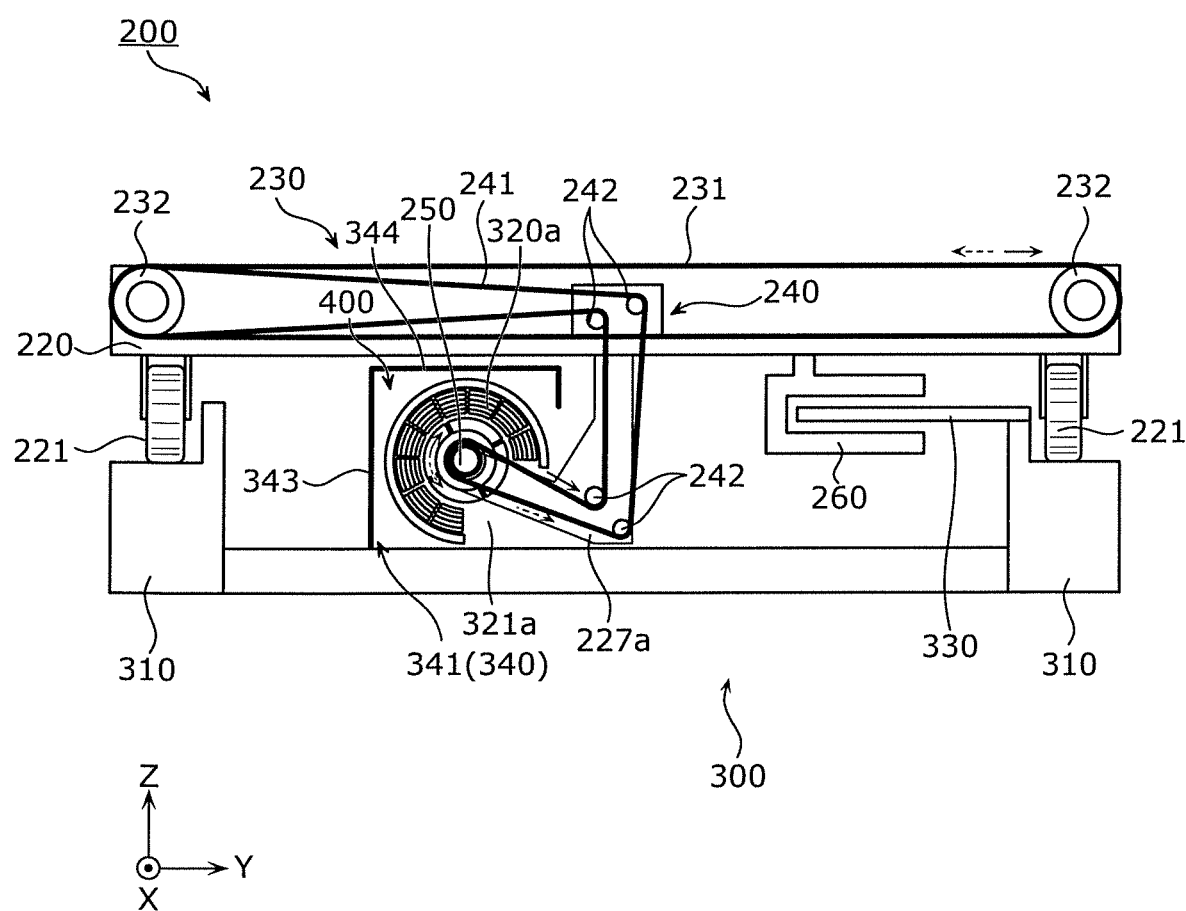
FIG. 6 is a cross-sectional view of the article conveyance apparatus according to Modification 2, which is taken along the transverse direction of the conveyance carriage.

FIG. 6 is a cross-sectional view of the article conveyance apparatus according to Modification 2, which is taken along the transverse direction of the conveyance carriage. As illustrated in FIG. 6, in Modification 2, first stator 320a is disposed such that opening 321a is directed obliquely downwardly. Specifically, opening 321a is directed in a direction inclined from the Y-axis direction by 45 degrees to the minus side of the Z-axis direction. Even in this configuration, the inside of first stator 320a is not seen from opening 321a in top view of first stator 320a.

Even in this configuration, part of support member 227a is shaped not to interfere with first stator 320a. Specifically, the part of support member 227a is suspended to approximately the same position as that of the lower end of first stator 320a. For this reason, in Modification 2, second portion 342 of shielding plate 340 is removed to prevent interference with support member 227a.

Figure 7:
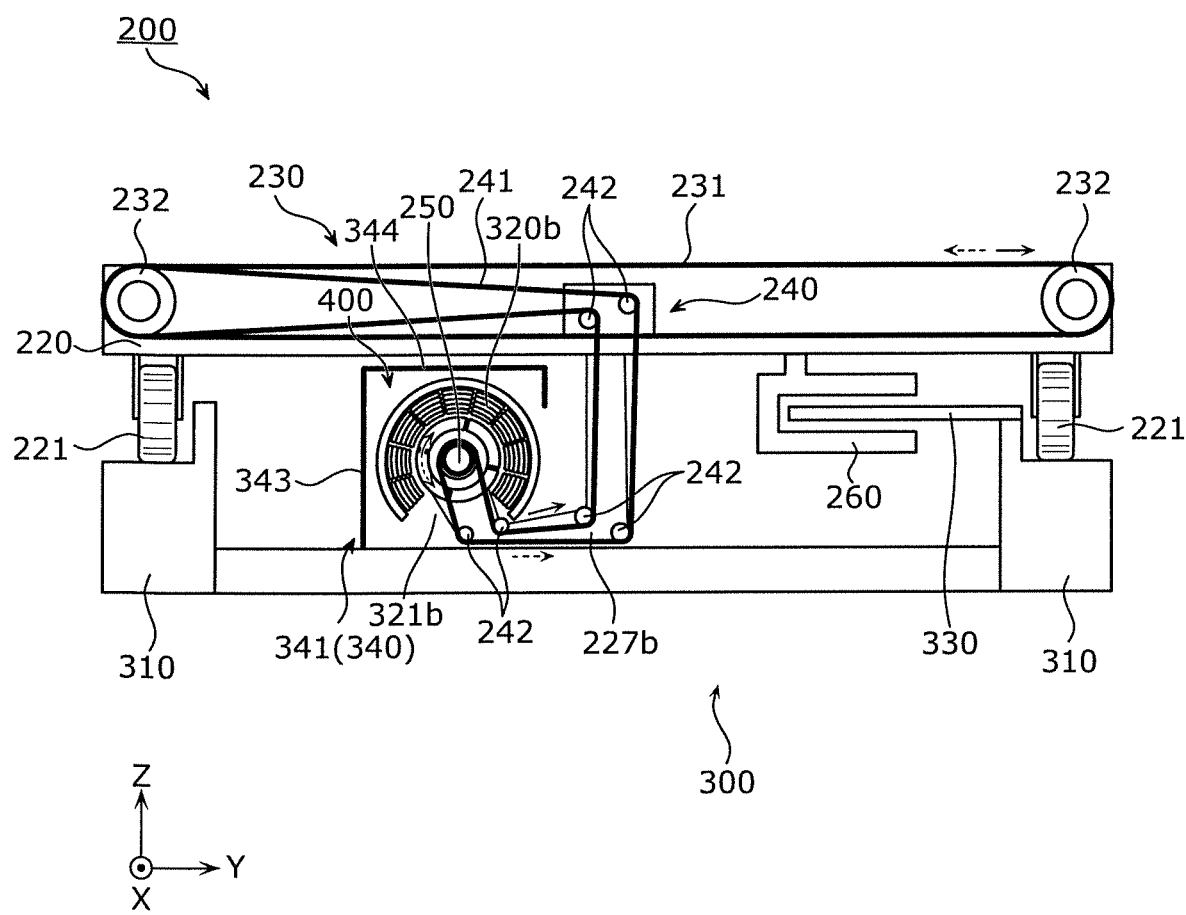
FIG. 7 is a cross-sectional view of the article conveyance apparatus according to Modification 3, which is taken along the transverse direction of the conveyance carriage.

FIG. 7 is a cross-sectional view of the article conveyance apparatus according to Modification 3, which is taken along the transverse direction of the conveyance carriage. As illustrated in FIG. 7, in Modification 3, first stator 320b is disposed such that opening 321b is directed immediately below. Specifically, opening 321b is directed to the minus side of the Z-axis direction. Even in this configuration, the inside of first stator 320b is not seen from opening 321b in top view of first stator 320b.

Even in this configuration, part of support member 227b included therein is shaped not to interfere with first stator 320b. Specifically, the part of support member 227b is suspended to approximately the same position as that of the lower end of first stator 320b. For this reason, in Modification 3, second portion 342 of shielding plate 340 is removed to prevent interference with support member 227b.

Other Examples

Although the article conveyance apparatuses according to representative configurations have been described based on the examples, these examples should not be construed as limitations to this disclosure. The one or more aspects may also cover a variety of modifications conceived by persons skilled in the art without departing from the gist of this disclosure, and examples including combinations made of the components in different examples.

For example, although an article conveyance apparatus 100 in the example above includes shielding plate 340 has been described, shielding plate 340 may not be disposed. Without shielding plate 340, opening 321 of first stator 320 is disposed in a position such that the inside of first stator 320 is not seen from opening 321 in top view of first stator 320. Thus, invasion of foreign substances into opening 321 of first stator 320 from above can be blocked.

Although the traveling rails in the example above define an annular path having an oval shape or a rectangular shape as an endless path, the traveling rails may define not only an annular path but also an 8-shaped path or a θ-shaped path. In other words, the traveling rails may define a path partially containing an annular path.

INDUSTRIAL APPLICABILITY

This disclosure is useful as an article conveyance apparatus in which the path on which the conveyance carriage travels can be sufficiently utilized as a path for conveying articles.

The invention claimed is:

1. An article conveyance apparatus, comprising:
    a carriage configured to travel along a predetermined travel path; and
    an on-ground facility including a pair of traveling rails that define the travel path,
    wherein the carriage includes:
    a transfer mechanism configured to transfer an article in a transfer space disposed in a predetermined position on the predetermined travel path;
    a first slider that is a rod-shaped member extending under the transfer mechanism in a traveling direction, and configured to operate according to magnetic action to drive the transfer mechanism; and
    a drive transmission mechanism configured to support the first slider and transmit a driving force from the first slider to the transfer mechanism, the drive transmission mechanism going through a space between the pair of traveling rails, the on-ground facility includes a first stator disposed in a position corresponding to the transfer space to apply magnetic action to the first slider in the carriage located in the transfer space to operate the first slider, the first stator includes an opening through which the drive transmission mechanism of the carriage located in the transfer space passes, and enables placement of the first slider inside the first stator, and the opening is disposed in a position such that an inside of the first stator is not seen from the opening in top view of the first stator.

2. The article conveyance apparatus according to claim 1, wherein the first stator comprises a plurality of first stators separately arranged along the travel path.

3. The article conveyance apparatus according to claim 1, wherein the carriage comprises a plurality of carriages, and the plurality of carriages travels freely and independently of each other.

4. The article conveyance apparatus according to claim 1, wherein the on-ground facility includes second stators disposed along the travel path, and the carriage includes a second slider configured to operate according to magnetic action from the second stators to cause the carriage to travel along the travel path.

5. The article conveyance apparatus according to claim 1, wherein the on-ground facility includes a shielding plate configured to cover a region not including at least the first stator in a moving path on which the first slider moves when the carriage travels on the travel path.

* * * * *